United States Patent [19]
Maxwell et al.

[11] Patent Number: 5,971,111
[45] Date of Patent: Oct. 26, 1999

[54] BALANCED BRAKE ASSEMBLY HAVING COINCIDENT PISTON APPLICATION

[75] Inventors: Scott D. Maxwell, Renton; Charles Perry Briscoe, SeaTac, both of Wash.

[73] Assignee: The Boeing Company, Seattle, Wash.

[21] Appl. No.: 08/731,763

[22] Filed: Oct. 18, 1996

[51] Int. Cl.$^6$ ............................ F16D 55/228; F16D 55/26
[52] U.S. Cl. .................... 188/72.5; 188/71.5; 192/109 R
[58] Field of Search ................................. 188/71.5, 71.3, 188/71.4, 72.5; 192/85 A, 85 AB, 87.11, 109 R

[56] References Cited

U.S. PATENT DOCUMENTS

| | | | |
|---|---|---|---|
| 3,525,421 | 8/1970 | Van Sickle et al. . | |
| 4,335,808 | 6/1982 | Johnson | 188/72.5 X |
| 4,360,683 | 11/1982 | Weisman | 188/72.5 X |
| 5,168,963 | 12/1992 | Poncini | 188/72.5 |
| 5,203,438 | 4/1993 | Ide | 188/72.5 X |

*Primary Examiner*—Robert J. Oberleitner
*Assistant Examiner*—Robert A. Siconolfi

*Attorney, Agent, or Firm*—Christensen O'Connor Johnson and Kindness PLLC

[57] ABSTRACT

A brake assembly (30) has a plurality of brake fluid actuated pistons. The brake assembly includes a brake inlet port (46) for receiving brake fluid from a fluid reservoir. The brake assembly includes a plurality of cylinders (32, 34, 36, 38, 40, 42, and 44) for actuating a corresponding plurality of pistons. The plurality of cylinders includes at least a first cylinder (32), a second cylinder (44), and a third cylinder (38) for actuating corresponding pistons. The first, second, and third pistons actuate at first, second, and third time intervals. A fluid distribution manifold (48) is connected in fluid communication with the brake inlet port. A plurality of cylinder manifolds (50) includes at least a first cylinder manifold connected in fluid communication with the fluid distribution manifold and the first cylinder, a second cylinder manifold connected in fluid communication with the fluid distribution manifold and the second cylinder, and a third cylinder manifold connected in fluid communication with the fluid distribution manifold and the third cylinder. The first, second, and third cylinder manifolds connect the first, second, and third cylinders in parallel fluid flow, and the parallel fluid flow tends to equalize the first, second, and third time intervals.

7 Claims, 4 Drawing Sheets

Fig. 1

(PRIOR ART)

BALANCED BRAKE ASSEMBLY HAVING COINCIDENT PISTON APPLICATION

FIELD OF THE INVENTION

The present invention relates to a brake assembly, and more particularly to a balanced aircraft brake assembly having coincident piston application.

BACKGROUND OF THE INVENTION

Figure 1:
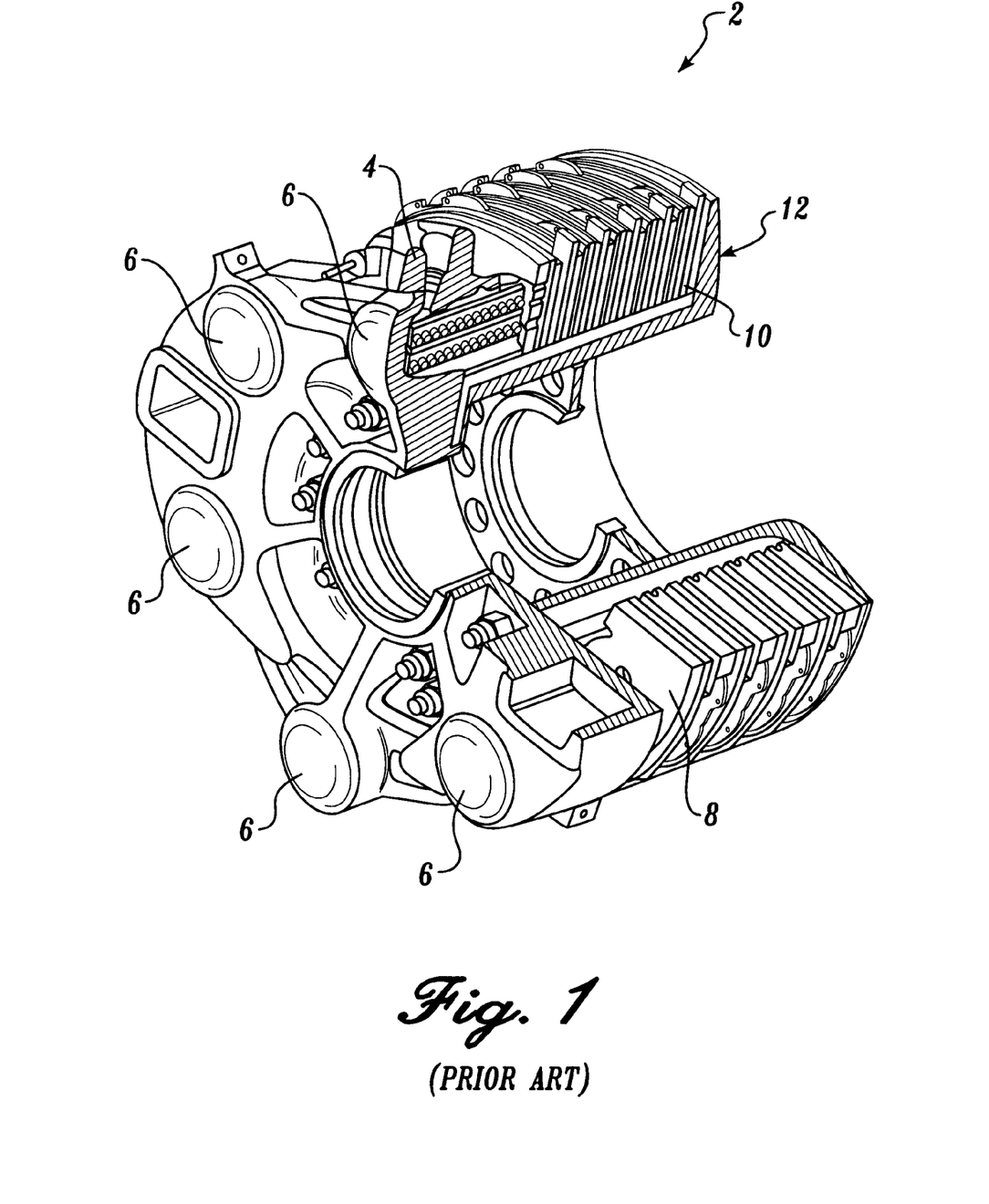
FIG. 1 is a pictorial view of a prior art brake assembly with a radial section cut away.

Airplane brake assemblies are well known in the art. FIG. 1 shows a typical prior art brake assembly 2. The brake assembly 2 includes a brake inlet port 4. The brake inlet port 4 is typically located at the top of the brake assembly 2 for purging air bubbles that may be present in brake assembly hydraulic fluid. The brake assembly 2 further includes a plurality of piston and cylinder assemblies 6, a pressure plate 8, a plurality of rotor and stator assemblies 10, and a torque tube 12. As can be seen in FIG. 1, the piston and cylinder assemblies 6 are located in a substantially circular arrangement about the brake assembly 2 for providing an even pressure distribution about the pressure plate 8.

Figure 2:
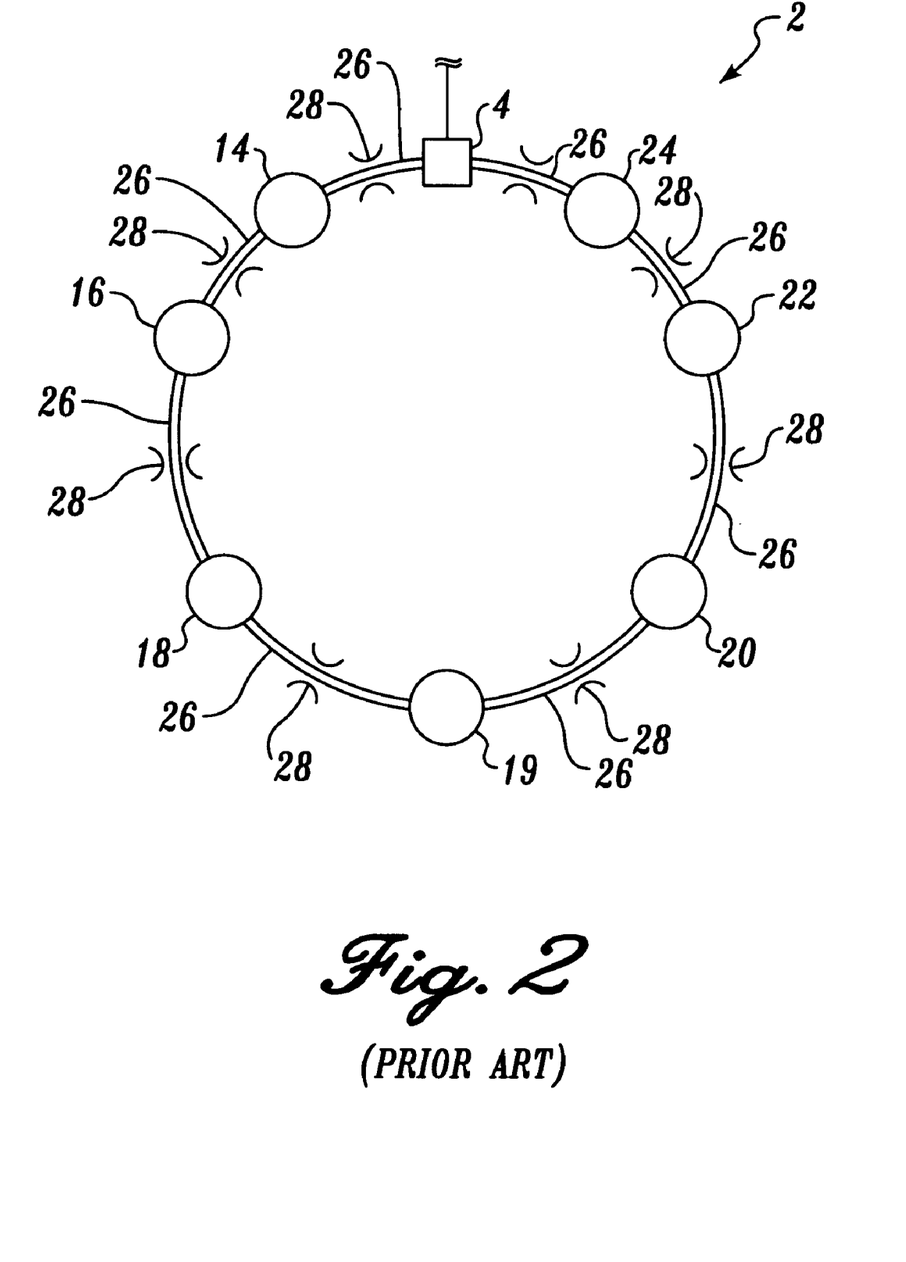
FIG. 2 is a schematic diagram of a typical prior art brake assembly.

FIG. 2 shows a schematic diagram of a typical brake assembly, such as the brake assembly 2 of FIG. 1. The brake inlet port 4 is shown at the top of the brake assembly 2. However, it is well known in the art to locate the inlet port at any position on the brake assembly. The brake inlet port 4 is coupled to a header from a hydraulic fluid reservoir (not shown). The cylinders 14, 16, 18, 19, 20, 22, and 24 are connected in series fluid communication via hydraulic manifold sections 26. The cylinders 14 and 24 are also coupled to the brake inlet port 4 via manifold sections 26. Flow restrictors 28 may be included in each of the manifold sections 26.

When a pilot applies an aircraft's brakes, hydraulic fluid flows from the hydraulic reservoir (not shown) through the header to the brake inlet port 4. When hydraulic fluid is introduced to the brake inlet port 4, hydraulic fluid first flows to the cylinders 14 and 24 that are coupled to the brake inlet port 4. Hydraulic fluid pressure increases within the cylinders 14 and 24 as they fill. When the pressure in the cylinders 14 and 24 reaches a predetermined threshold, their associated pistons actuate and press against the pressure plate 8, which clamps the rotor and stator assemblies 10 against the torque tube 12. After the cylinders 14 and 24 have filled, hydraulic fluid next flows through the manifold sections 26 to the cylinders 16 and 22. The cylinders 16 and 22 fill with hydraulic fluid and, in turn, hydraulic fluid flows through the manifold sections 26 to the cylinders 18 and 20. Finally, after flowing through the above-identified series of cylinders, hydraulic fluid flows to and fills the cylinder 19. Thus, the pistons associated with the cylinders 14, 16, 22, and 24, located toward the brake inlet 4 at the top of the brake assembly 2, actuate and clamp the rotor and stator assemblies 10 against the torque tube 12 before the pistons associated with the cylinders 18, 19, and 20, located toward the bottom of the brake assembly 2 away from the brake inlet port 4, actuate and clamp against the torque tube 12.

As a result, the rotor and stator assemblies 10 near the brake inlet port 4 at the top of the brake assembly 2 are compressed before the rotor and stator assemblies 10 farther away from the brake inlet port 4 at the bottom of the brake assembly 2. In some known brake assemblies, the time delay between actuation of piston and cylinder assemblies located closer to the brake inlet port and actuation of piston and cylinder assemblies located farther away from the brake inlet port has been recorded in excess of 50 ms. This time delay causes the torque tube 12 to react through the rotor and stator assemblies 10 at the top of the brake assembly 2 against the piston and cylinder assemblies 6 at the top of the brake assembly 2 while the piston and cylinder assemblies 6 at the bottom of the brake assembly 2 are still compressing against the torque tube 12. This results in a lateral displacement between the top and bottom regions of the rotor and stator assemblies 10 and the torque tube 12. When the piston and cylinder assemblies 6 at the bottom of the brake assembly 2 actuate, the bottom of the torque tube 12 reacts through the bottom region of the rotor and stator assemblies 10 against the piston and cylinder assemblies 6 at the top of the brake assembly 2. This, in combination with a return force from the top region of the torque tube 12 causes the clamping force at the top region of the brake assembly 2 to decrease relative to the clamping force at the bottom of the brake assembly 2. When the asymmetric clamping cycle and corresponding lateral displacement repeats for a rotating wheel, a vibration of the brake results. The vibration is known as "brake whirl" or "brake wheel vibration."

An imbalance in piston pressure exists across the brake assembly 2 during the time that the pistons are actuating. Piston pressures and torque tube clamping forces are not equalized across the brake assembly 2 during pressure transitions. Each piston actuates as an individual dynamic element within the brake assembly 2, rather than all the brake pistons actuating together as a single element. The resulting differential pressure between the pistons during braking undesirably reduces overall brake system stiffness.

The asymmetric clamping cycle described above can also cause stators to develop a tapered wear pattern. Further, the time delay between actuation of top and bottom region pistons degrades the frequency response of the brake assembly 2. Because the frequency response of the brake assembly 2 is lower than the frequency response of autobrake and antiskid valves included in aircraft brake systems, degradation in the brake assembly frequency response degrades frequency response of the overall braking system.

It would therefore be desirable to minimize time delays between actuation of brake pistons in order to minimize asymmetric clamping. Many prior art brake assemblies 2 include the flow restrictors 28 in the manifold sections 26 in an attempt to reduce brake wheel vibration or brake whirl. As can be appreciated, the flow restrictors 28 instead serve to further increase the time delay between actuation of brake pistons. Therefore, the flow restrictors 28 make brake clamping even more asymmetric and worsen the problems of brake whirl, uneven stator wear, and degraded frequency response. There is thus an unmet need in the art to minimize asymmetric brake clamping.

SUMMARY OF THE INVENTION

A brake assembly constructed in accordance with the present invention includes a plurality of brake fluid actuated pistons. The brake assembly includes a brake inlet port for receiving brake fluid from a fluid reservoir. A plurality of cylinders actuates a corresponding plurality of pistons, and includes at least a first cylinder, a second cylinder, and a third cylinder for actuating corresponding pistons. A fluid distribution manifold is connected in fluid flow communication with the brake inlet port and the first, second, and third cylinders. The fluid distribution manifold connects the first, second, and third cylinders in parallel fluid flow.

The balanced brake assembly of the present invention actuates brake pistons at substantially the same time and minimizes asymmetric brake clamping. Thus, the problems of brake whirl, uneven stator wear patterns, and degraded brake assembly frequency response are minimized.

In one embodiment of the present invention, first, second, and third manifold sections couple the first, second, and third cylinders in parallel fluid communication with the fluid distribution manifold. In a further aspect of the present invention, the first and second manifold sections include first and second flow restrictors.

In an alternate embodiment, a brake assembly has a plurality of brake fluid actuated pistons. The brake assembly includes a plurality of cylinders for actuating a corresponding plurality of pistons, including at least a first cylinder, a second cylinder, and a third cylinder for actuating corresponding pistons. A brake inlet port receives brake fluid from a fluid reservoir, and is disposed equidistant from each of the cylinders. The brake assembly includes a plurality of manifolds. Each of the manifolds couples the brake inlet port to an associated cylinder and has an equalized length and an equalized volume such that each of the cylinders actuates its corresponding piston at an equalized time interval.

According to a further aspect, the plurality of manifolds is disposed radially from the brake inlet port.

In another alternate embodiment, the brake assembly has a plurality of brake fluid actuated pistons. The brake assembly includes a brake inlet port for receiving brake fluid from a fluid reservoir. A fluid distribution manifold is connected in fluid communication with the brake inlet port. A first cylinder is provided for actuating a first brake piston. The first cylinder is connected in fluid communication to a first supply segment of the fluid distribution manifold to define a first fluid path distance from the brake inlet port. A second cylinder is provided for actuating a second brake piston. The second cylinder is connected in fluid communication to a second supply segment of the fluid distribution manifold to define a second fluid path distance from the brake inlet port that is greater than the first fluid path distance. The fluid distribution manifold includes a distribution segment coupling the first and second supply segments of the fluid distribution manifold to equalize the supply of brake fluid to the first and second cylinders.

In a further aspect, the distribution segment couples the first and second cylinders in parallel fluid communication.

In an even further aspect, the distribution segment couples the first and second cylinders in series fluid communication, and the first and second supply segments couple the first and second cylinders in parallel fluid communication.

The present invention provides a method of concurrently actuating a plurality of brake fluid actuated pistons of a brake assembly. The brake assembly has a brake inlet port. The brake assembly includes at least a first cylinder for actuating a first piston, a second cylinder for actuating a second piston, and a third cylinder for actuating a third piston. The first cylinder is coupled in fluid communication with the brake inlet port through a first fluid flow path, the second cylinder is coupled in fluid communication with the brake inlet port through a second fluid flow path, and the third cylinder is coupled in fluid communication with the brake inlet port through a third fluid flow path. Brake fluid is applied to the brake inlet port. Brake fluid is supplied from the brake inlet port to the first brake cylinder for actuating the first brake piston and to the second brake cylinder for actuating the second brake piston. Brake fluid is concurrently supplied from the brake inlet port to the third brake cylinder in parallel fluid communication with the brake fluid supplied to the first and second cylinders, such that the first, second, and third brake pistons actuate at an equalized time interval.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 3:
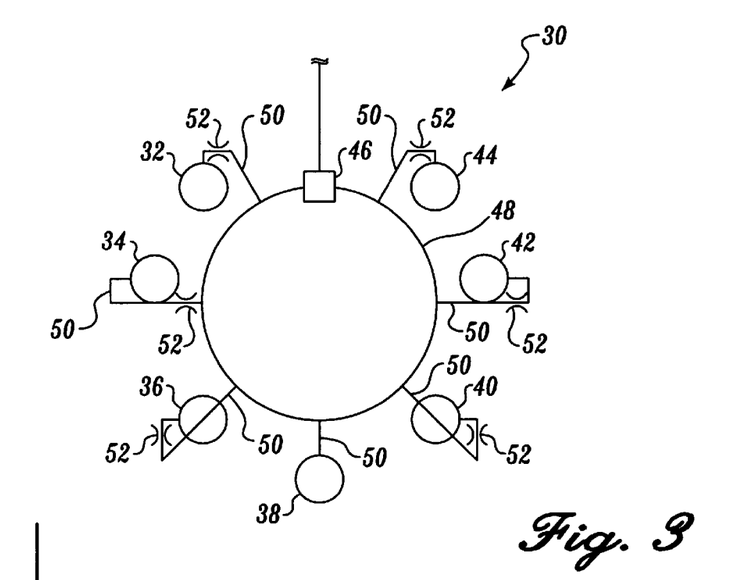
FIG. 3 is a schematic diagram of a brake assembly according to a first embodiment of the present invention.

FIG. 3 shows a schematic diagram of a brake assembly 30 according to a first embodiment of the present invention. The brake assembly 30 includes cylinders 32, 34, 36, 38, 40, 42, and 44. The brake assembly 30 includes a brake inlet port 46. The brake inlet port 46 is suitably located at the top of the brake assembly 30 for purging air bubbles that may be present in brake assembly hydraulic fluid. However, the location of a brake inlet port 46 at other than the top of the brake assembly 30 is also acceptable, as is known in the art. The brake inlet port 46 is coupled to a brake system header (not shown) for receiving brake hydraulic fluid for distribution to the plurality of brake cylinders. The brake assembly 30 also includes pistons (not shown), a pressure plate (not shown), rotor and stator assemblies (not shown) and a torque tube (not shown), configured similarly to those components of conventional brake assemblies, such as the previously described brake assembly 2 shown in FIG. 1. However, the routing of hydraulic brake fluid to the cylinders of the brake assembly 30 of the present invention is distinct from that previously described.

In the brake assembly 30, a parallel distribution manifold 48 is coupled to the brake inlet port 46 and to each of the cylinders 32, 34, 36, 38, 40, 42, and 44. The parallel distribution manifold 48 may be a substantially circular manifold. In such an embodiment, the shape of the parallel distribution manifold 48 corresponds to the arrangement of the plurality of pistons and cylinders about the brake assembly 30. Manifold sections 50 couple the parallel distribution manifold 48 to each of the cylinders of the brake assembly 30. An individual manifold section 50 branches radially off of the parallel distribution manifold 48 to supply hydraulic brake fluid to a corresponding cylinder. It is desirable that the manifold sections 50 be as straight and short as practicable in order to minimize hydraulic losses and reduce time delays in filing cylinders with hydraulic fluid.

Figure 4:
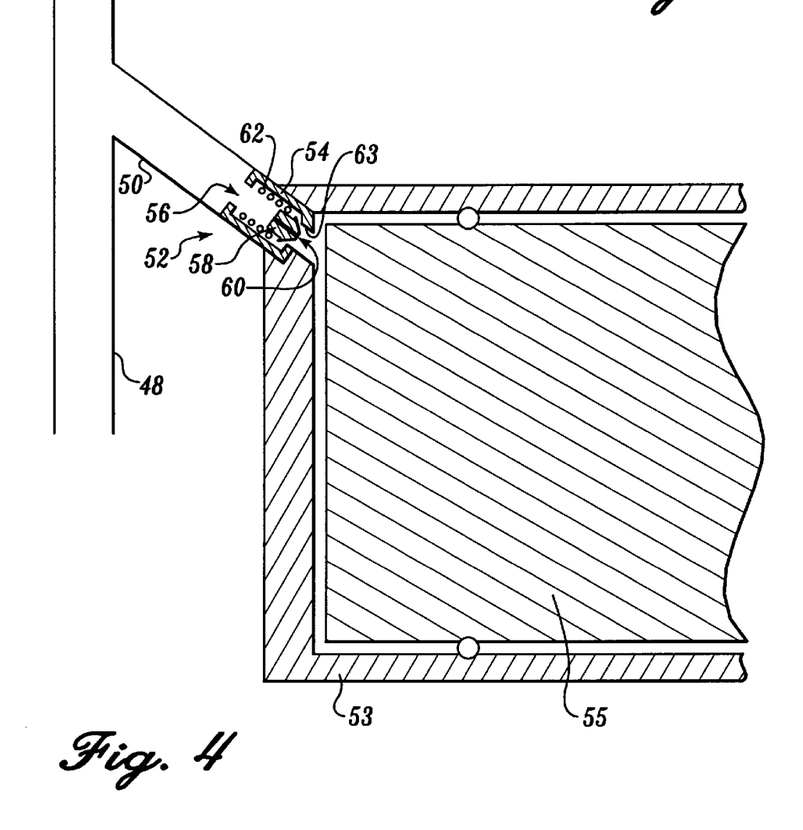
FIG. 4 is a cross-sectional schematic view of a flow restrictor disposed within a manifold branch that supplies hydraulic brake fluid to a cylinder, an end portion of which is shown, for the embodiment of the present invention shown in FIG. 3.

In a further aspect of the brake assembly 30, a flow restrictor 52 may be included in each of the manifold sections 50 coupled to corresponding cylinders 32, 34, 36, 40, 42, and 44, as indicated in FIG. 3. FIG. 4 shows a pictorial view of one embodiment of a flow restrictor 52 mounted within a manifold section 50, which supplies fluid to a representative cylinder 53 and piston 55. As seen in FIG. 4, the flow restrictor 52 may be configured as a restrictor check valve. The flow restrictor 52 includes a cylindrical body 54, which is preferably located at the top of its associated cylinder and is oriented upwardly from horizontal for purging any air bubbles that may be present in the brake hydraulic fluid. The body 54 of the flow restrictor 52 includes a first orifice 56 in the end of the restrictor 52 that is in closest proximity to the manifold section 50. The flow restrictor 52 includes a floating restrictor piston 58 that includes a second orifice 60 that is smaller than the first orifice 56. The flow restrictor 52 also includes a low-force return spring 62 that biases the floating piston 58 into sealing engagement with an outlet port 63 of the body 54.

When a cylinder with one of the flow restrictors 52 fills, the restrictor piston 58 is held in sealing engagement against outlet port 63 by hydraulic pressure from the manifold 48 and return spring force, and fluid flows through the second orifice 60 in restrictor piston 58 to its associated cylinder. When brake application has ended, hydraulic pressure within the cylinder causes the restrictor piston 58 to move out of engagement with the outlet port 63 such that the restrictor check valve 54 is held open until differential pressure between the first orifice 56 and the outlet port 63 is less than the return spring 62 force. This provides an outlet port that is large enough so air can readily escape.

When the brakes are applied in an aircraft utilizing the brake assembly 30, hydraulic fluid is supplied to the brake inlet port 46, as shown in FIG. 3. Hydraulic fluid flows from the brake inlet port 46 to the parallel distribution manifold 48. Hydraulic fluid flows in parallel fluid communication from the parallel distribution manifold 48 through the manifold sections 50 to each of the cylinders 32, 34, 36, 38, 40, 42, and 44. Each of the cylinders of the brake assembly 30 fills at substantially the same time, and the pistons of the brake assembly 30 thus actuate substantially simultaneously.

It will be appreciated that actuating the various brake pistons substantially simultaneously represents a significant improvement over brake assemblies previously known in the art, such as that illustrated in FIGS. 1 and 2. In the present invention, any time differences in filling the cylinders of the brake assembly 30 are due to some cylinders being located farther away from the brake inlet port 46 than other cylinders. For example, the cylinders 34 and 42 are coupled to the parallel distribution manifold 48 slightly farther away from the brake inlet port 46 than are the cylinders 32 and 44. Likewise, the cylinders 36 and 40 are coupled to the parallel distribution manifold 48 downstream of the cylinders 34 and 42. Finally, the cylinder 38 is coupled to the parallel distribution manifold 48 downstream of the cylinders 36 and 40. The cylinders 32 and 44 may fill with hydraulic fluid shortly before the cylinders 34 and 42 fill. Likewise, the cylinders 36 and 40 may fill just after the cylinders 34 and 42 fill. Finally, the cylinder 38 may fill shortly after the cylinders 36 and 40 fill. However, it will be appreciated that any such time delay is negligible compared to the substantial time delays between piston actuation in series-configured brake assemblies previously known in the art.

The use of flow restrictors 52, such as those illustrated in FIGS. 3 and 4, further minimizes any time delay between the filling of each of the cylinders. As described above, the cylinder 38 fills last because it is farthest from the brake inlet port 46. Therefore, further restricting the flow of hydraulic fluid to the cylinder 38 by including a flow restrictor in the manifold section 50 coupled to the cylinder 38 is not desirable. The flow restrictors 52 associated with the cylinders 32 and 44 have orifices of a first predetermined diameter to insert a first time delay such that the cylinders 32 and 44 fill at substantially the same time that the cylinder 38 fills. Likewise, the flow restrictors 52 associated with the cylinders 34 and 42 have orifices of a second predetermined diameter, greater than the first predetermined diameter, to insert a second time delay, shorter than the first time delay, such that the cylinders 34 and 42 fill at substantially the same time as the cylinder 38. Finally, the flow restrictors 52 associated with the cylinders 36 and 40 have a still greater third predetermined diameter to insert a third time delay, shorter than the second time delay, such that the cylinders 36 and 40 fill at substantially the same time as the cylinder 38. Thus, it is preferred that flow restrictors 52 be included in the brake assembly 30. However, a brake assembly 30 that does not include flow restrictors 52 presents a major improvement in reducing cylinder actuation time delays.

Figure 5:
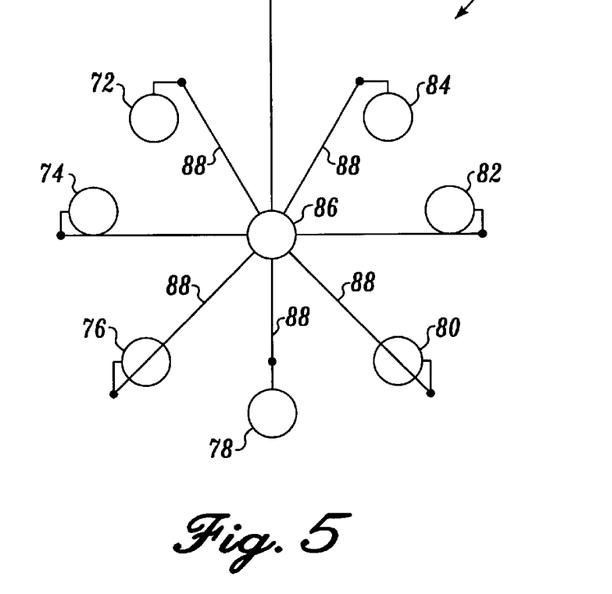
FIG. 5 is a schematic diagram of a brake assembly according to another embodiment of the present invention.

FIG. 5 shows a schematic diagram of a second embodiment of a brake assembly 70 of the present invention. The brake assembly 70 includes cylinders 72, 74, 76, 78, 80, 82, and 84. Each of the cylinders shown in FIG. 5 is associated with a brake piston (not shown) for pressing against a pressure plate (not shown) and clamping brake rotor and stator assemblies (not shown) against a torque tube (not shown) in a known manner. The plurality of cylinders and associated pistons are arranged radially in a substantially circular manner about the brake assembly 70, as is known.

The brake assembly 70 includes a brake inlet port 86. In this embodiment of the present invention, the brake inlet port 86 is not located at the top of brake assembly 70. Instead, the brake inlet port 86 is located at a central location within the circular arrangement of cylinders so that the brake inlet port 86 is substantially equidistant from the cylinders. The brake inlet port 86 is coupled to a brake system (not shown) for receiving brake hydraulic fluid for distribution to the plurality of brake cylinders.

Manifold sections 88 are provided for coupling the brake inlet port 86 to each of the cylinders. Each manifold section 88 is substantially the same length and has substantially the same volume. Each manifold section 88 should be as short and straight as practicable to minimize hydraulic losses and reduce time delays in filling the cylinders with hydraulic fluid. As can be seen in FIG. 5, the manifold sections 88 extend radially outward from the brake inlet port 86 to the plurality of cylinders.

The brake assembly 70 achieves substantially coincident piston application as follows. When the brakes are applied, hydraulic fluid is supplied to the brake inlet port 86. Hydraulic fluid flows from the brake inlet port 86 through the manifold sections 88 to the plurality of cylinders. Because the manifold sections 88 are substantially the same size, hydraulic fluid is supplied to each of the cylinders at substantially the same time after the hydraulic fluid is supplied to the brake inlet port 86.

Figure 6:
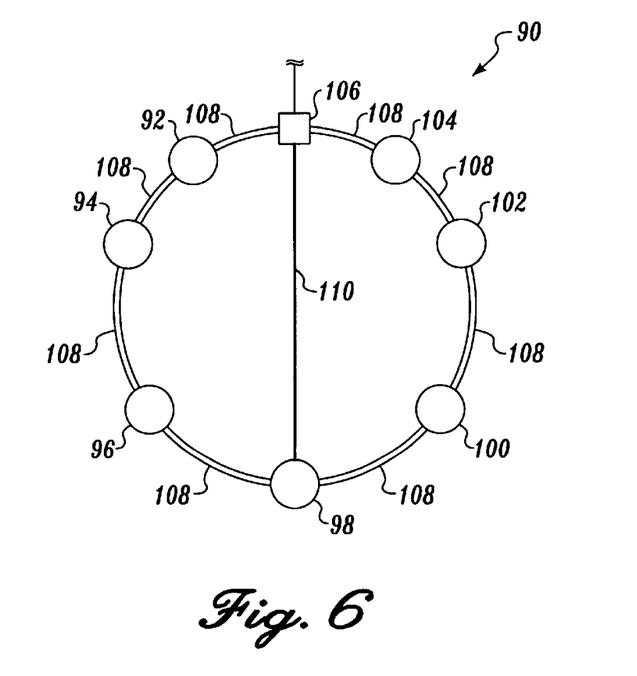
FIG. 6 is a schematic diagram of another embodiment of a brake assembly of the present invention.

FIG. 6 shows a schematic diagram of a third embodiment of a brake assembly 90 according to the present invention. The brake assembly 90 has a plurality of cylinders 92, 94, 96, 98, 100, 102, and 104. Each of the cylinders is associated with a brake piston (not shown) for pressing against a pressure plate (not shown) to clamp brake rotor and stator assemblies (not shown) against a torque tube (not shown) in a known manner. As is known in the art, the plurality of cylinders and pistons are arranged radially in a circular manner about the brake assembly 90 for providing even clamping pressure. The cylinders 92 and 104 are preferably located near a top region of the brake assembly 90 that is near a brake inlet port 106, and the cylinder 98 is preferably located near a bottom region of the brake assembly 90 that is farther away from the brake inlet port 106. The brake assembly 90 includes manifold sections 108. The brake inlet port is suitably located at the top region of the brake assembly 90, as is well known in the art, but the location of the brake inlet port 106 may be anywhere on the brake assembly 90. The manifold sections 108 couple the cylinders 92, 94, 96, 98, 100, 102, and 104 in series fluid communication with the brake inlet port 106, as is also known in the art.

However, in accordance with the present invention, a parallel distribution manifold section 110 also hydraulically couples the lowermost cylinder 98 to the brake inlet port 106. The cylinders 98, 92, and 104 are thus coupled in parallel fluid communication.

The embodiment of the present invention shown in FIG. 6 reduces asymmetric clamping of brake assemblies known in the prior art by incorporating a parallel fluid flow path into a brake assembly having a series flow path. The brake assembly 90 operates as follows. When the brakes are applied, hydraulic fluid is initially supplied to the brake inlet port 106. Hydraulic fluid flows from the brake inlet port 106 through the manifold sections 108 to the cylinders 92 and 104, as is well known in the art. In accordance with the present invention, hydraulic fluid also flows through the parallel distribution manifold section 110 to the cylinder 98. The cylinders 92, 104, and 98 therefore fill with hydraulic fluid at substantially the same time. Therefore, the pistons (not shown) associated with the cylinders 92 and 104 located near the top region of the brake assembly 90 actuate substantially coincident with the piston (not shown) associated with the cylinder 98 located near the bottom region of the brake assembly 90. It has been shown during testing that pressure equalization of cylinders in response to a step input occurred in 25% less time than the pressure equalization time for known brakes having only a series-connected manifold. This represents a major improvement over known brake assemblies that fill cylinders and actuate pistons solely in series. It will be appreciated that the brake assemblies 30 and 70 described above will provide an even more pronounced improvement over known brake assemblies that fill cylinders and actuate pistons solely in series.

The brake assembly 90 further reduces asymmetric brake clamping over brake assemblies known in the art. The cylinders 94 and 102 fill with hydraulic fluid after the cylinders 92 and 104 fill with hydraulic fluid, as is known. However, the cylinders 96 and 100 fill with hydraulic fluid after the cylinder 98 fills with hydraulic fluid. Because the cylinder 98 fills with hydraulic fluid at substantially the same time as the cylinders 92 and 104 fill with hydraulic fluid, the cylinders 94 and 102 fill at substantially the same time as the cylinders 96 and 100. Thus, the brake assembly 90 greatly reduces asymmetry in brake clamping over asymmetric brake clamping inherent in brake assemblies known in the prior art.

While the preferred embodiment of the invention has been illustrated and described, it will be appreciated that various changes can be made therein without departing from the spirit and scope of the invention. For example, the parallel distribution manifold 48 may be incorporated as a retrofit into a conventional brake assembly having cylinders connected in series. As a further example, the brake inlet port 86 and the manifold sections 88 may also be incorporated as a retrofit into a conventional brake assembly having cylinders connected in series. In these examples, the cylinders preferentially fill through the parallel distribution manifold 48 or the manifold sections 88 rather than filling sequentially through series connections. Accordingly, the invention is not limited except as by the appended claims.

The embodiments of the invention in which an exclusive property or privilege is claimed are defined as follows:

1. A brake assembly having a plurality of fluid actuated pistons, the brake assembly comprising:

a brake inlet port for receiving fluid from a fluid reservoir;

a plurality of cylinders for actuating a corresponding plurality of pistons, including at least a first cylinder, a second cylinder, and a third cylinder for actuating corresponding pistons;

a fluid distribution manifold connected in fluid communication with the brake inlet port and the first, second, and third cylinders, the fluid distribution manifold connecting the first, second, and third cylinders in parallel fluid flow;

a first manifold section for coupling the first cylinder in fluid communication with the fluid distribution manifold;

a second manifold section for coupling the second cylinder in fluid communication with the fluid distribution manifold;

a third manifold section for coupling the third cylinder in fluid communication with the fluid distribution manifold: and a first flow restrictor provided in the first manifold section to reduce an effective diameter of the first manifold section by a predetermined amount, and a second flow restrictor provided in the second manifold section to reduce an effective diameter of the second manifold section by a predetermined amount, the fluid distribution manifold and the first and second flow restrictors tending to synchronize the actuation of the first, second, and third pistons.

2. The brake assembly of claim 1, wherein the first and second flow restrictors are check valves.

3. The brake assembly according to claim 1, further comprising:

a third flow restrictor provided in the third manifold section to further synchronize the actuation of the first, second, and third pistons.

4. The brake assembly according to claim 1 further comprising:

a second fluid distribution manifold connected in fluid communication with the brake inlet port and the first, second, and third cylinders, the second fluid distribution manifold connecting the first, second, and third cylinders in series fluid flow.

5. A brake assembly having a plurality of brake fluid actuated pistons, the brake assembly comprising:

a brake inlet port for receiving brake fluid from a fluid reservoir;

a plurality of cylinders for actuating a corresponding plurality of pistons, including at least a first cylinder, a second cylinder, and a third cylinder for actuating corresponding pistons, the first, second, and third pistons actuating at first, second, and third time intervals;

a fluid distribution manifold connected in fluid communication with the brake inlet port;

a plurality of cylinder manifolds, including at least a first cylinder manifold connected in fluid communication with the fluid distribution manifold and the first cylinder, a second cylinder manifold connected in fluid communication with the fluid distribution manifold and the second cylinder, and a third cylinder manifold connected in fluid communication with the fluid distribution manifold and the third cylinder, wherein the first, second, and third cylinder manifolds connect the first, second, and third cylinders in parallel fluid flow, the parallel fluid flow tending to equalize the first, second, and third time intervals; and a first flow restrictor provided in the first cylinder manifold to reduce a diameter of the first cylinder manifold proximate the first cylinder by a predetermined amount, and a second flow restrictor provided in the second cylinder manifold to reduce a diameter of the second cylinder manifold proximate the second cylinder by a predetermined amount, the first and second flow restrictors further equalizing the first second, and third time intervals.

6. The brake assembly of claim 5, wherein the first and second flow restrictors each comprise a check valve.

7. The brake assembly according to claim 1, further comprising:

a third flow restrictor provided in the third cylinder manifold to further equalize the first, second, and third time intervals.

* * * * *

UNITED STATES PATENT AND TRADEMARK OFFICE
CERTIFICATE OF CORRECTION

PATENT NO. : 5,971,111
DATED : October 26, 1999
INVENTOR(S) : S.D. Maxwell et al.

It is certified that error appears in the above-identified patent and that said Letters Patent is hereby corrected as shown below:

COLUMN  LINE

10  6  "claim 1," should read --claim 5,--
(Claim 7, line 1)

Signed and Sealed this

Nineteenth Day of December, 2000

Attest:

Q. TODD DICKINSON

*Attesting Officer*  *Commissioner of Patents and Trademarks*